United States Patent
Welle

(10) Patent No.: US 7,650,910 B2
(45) Date of Patent: Jan. 26, 2010

(54) ELECTRO-HYDRAULIC VALVE APPARATUSES

(75) Inventor: Richard P. Welle, Huntington Beach, CA (US)

(73) Assignee: The Aerospace Corporation, El Segundo, CA (US)

(*) Notice: Subject to any disclaimer, the term of this patent is extended or adjusted under 35 U.S.C. 154(b) by 442 days.

(21) Appl. No.: 11/150,551

(22) Filed: Jun. 9, 2005

(65) Prior Publication Data

US 2005/0284526 A1    Dec. 29, 2005

Related U.S. Application Data

(63) Continuation-in-part of application No. 10/877,691, filed on Jun. 24, 2004, and a continuation-in-part of application No. 10/877,602, filed on Jun. 24, 2004.

(51) Int. Cl.
*F15C 1/04* (2006.01)

(52) U.S. Cl. .................................... 137/828

(58) Field of Classification Search ............ 137/833, 137/803, 807, 824, 565.16, 828; 251/11
See application file for complete search history.

(56) References Cited

U.S. PATENT DOCUMENTS

| | | | |
|---|---|---|---|
| 2,910,836 A * | 11/1959 | Karrer | 62/3.3 |
| 2,928,253 A | 3/1960 | Lopp et al. | |
| 3,111,813 A | 11/1963 | Blumentritt | |
| 3,197,342 A * | 7/1965 | Neild, Jr. | 136/210 |
| 3,397,860 A | 8/1968 | Bushmeyer | |
| 3,779,814 A | 12/1973 | Miles et al. | |
| 4,476,685 A | 10/1984 | Aid | |
| 4,938,258 A * | 7/1990 | Sato | 137/884 |
| 4,989,626 A | 2/1991 | Takagi et al. | |
| 5,101,848 A | 4/1992 | Kojima et al. | |
| 5,249,929 A | 10/1993 | Miller, Jr. et al. | |
| 5,603,351 A | 2/1997 | Cherukuri et al. | |
| 5,662,143 A * | 9/1997 | Caughran | 137/884 |
| 5,699,157 A | 12/1997 | Parce | |
| 5,795,788 A | 8/1998 | Bevan et al. | |
| 5,849,208 A * | 12/1998 | Hayes et al. | 216/94 |
| 5,975,856 A | 11/1999 | Welle | |
| 5,988,197 A | 11/1999 | Colin et al. | |
| 5,993,634 A | 11/1999 | Simpson et al. | |

(Continued)

OTHER PUBLICATIONS

W. Y. Sim, et al., "A phase-change type micropump with aluminum flap valves," *J. Micromech. Microeng.*, 13 (2003) 286-294 (published Jan. 29, 2003).

(Continued)

*Primary Examiner*—John Rivell
*Assistant Examiner*—Craig M Schneider
(74) *Attorney, Agent, or Firm*—Jones Day; Nicola A. Pisano; Jaime D. Choi

(57) ABSTRACT

An electro-hydraulic valve apparatus includes a flow channel, a hydraulic control channel defining an electro-hydraulic valve junction where the hydraulic control channel is adjacent to the flow channel, a flexible wall between the flow channel and the hydraulic control channel at the electro-hydraulic valve junction, and Peltier devices adjacent to the hydraulic control channel on opposite sides of the electro-hydraulic valve junction for controllably applying a hydraulic force against the flexible wall repositioning the flexible wall in relation to the flow channel to selectively close or open the electro-hydraulic valve apparatus.

16 Claims, 14 Drawing Sheets

ELECTRO-HYDRAULIC VALVE

U.S. PATENT DOCUMENTS

| | | | |
|---|---|---|---|
| 6,007,302 A | 12/1999 | Welle | |
| 6,086,740 A | 7/2000 | Kennedy | |
| 6,100,463 A | 8/2000 | Ladd et al. | |
| 6,149,123 A | 11/2000 | Harris et al. | |
| 6,159,744 A | 12/2000 | Bevan et al. | |
| 6,282,907 B1* | 9/2001 | Ghoshal | 62/3.7 |
| 6,283,718 B1 | 9/2001 | Prosperetti et al. | |
| 6,311,713 B1 | 11/2001 | Kaartinen | |
| 6,328,070 B2* | 12/2001 | Clayton et al. | 137/884 |
| 6,344,325 B1 | 2/2002 | Quake et al. | |
| 6,349,740 B1* | 2/2002 | Cho et al. | 137/487.5 |
| 6,382,254 B1 | 5/2002 | Yang et al. | |
| 6,408,878 B2 | 6/2002 | Unger et al. | |
| 6,453,928 B1* | 9/2002 | Kaplan et al. | 137/14 |
| 6,467,275 B1 | 10/2002 | Ghoshal | |
| 6,981,522 B2 | 1/2003 | O'Connor et al. | |
| 6,521,188 B1 | 2/2003 | Webster | |
| 6,536,476 B2 | 3/2003 | Ueno et al. | |
| 6,540,895 B1 | 4/2003 | Spence et al. | |
| 6,557,575 B1 | 5/2003 | Gerhardt et al. | |
| 6,561,479 B1* | 5/2003 | Eldridge | 251/11 |
| 6,575,188 B2 | 6/2003 | Parunak | |
| 6,598,403 B1 | 7/2003 | Ghoshal | |
| 6,599,098 B2 | 7/2003 | Weng et al. | |
| 6,619,311 B2 | 9/2003 | O'Connor et al. | |
| 6,637,210 B2* | 10/2003 | Bell | 62/3.7 |
| 6,658,860 B2 | 12/2003 | McGrew | |
| 6,679,279 B1 | 1/2004 | Liu et al. | |
| 6,767,706 B2 | 7/2004 | Quake et al. | |
| 6,793,753 B2 | 9/2004 | Unger et al. | |
| 6,857,449 B1* | 2/2005 | Chow | 137/833 |
| 6,877,528 B2* | 4/2005 | Gilbert et al. | 137/827 |
| 6,880,576 B2* | 4/2005 | Karp et al. | 137/806 |
| 6,959,555 B2* | 11/2005 | Bell | 62/3.7 |
| 7,008,193 B2* | 3/2006 | Najafi et al. | 417/244 |
| 7,128,081 B2 | 10/2006 | Dourdeville | |
| 7,195,036 B2 | 3/2007 | Burns et al. | |
| 7,241,421 B2 | 7/2007 | Webster et al. | |
| 2002/0007858 A1* | 1/2002 | Xu et al. | 137/828 |
| 2002/0029814 A1 | 3/2002 | Unger et al. | |
| 2002/0124879 A1* | 9/2002 | Kaplan et al. | 137/13 |
| 2002/0127736 A1 | 9/2002 | Chou et al. | |
| 2002/0143437 A1 | 10/2002 | Handique et al. | |
| 2002/0144738 A1 | 10/2002 | Unger et al. | |
| 2002/0145231 A1 | 10/2002 | Quake et al. | |
| 2002/0148234 A1* | 10/2002 | Bell | 62/3.3 |
| 2002/0150683 A1 | 10/2002 | Troian | |
| 2002/0166585 A1* | 11/2002 | O'Connor et al. | 137/87.01 |
| 2003/0008308 A1 | 1/2003 | Enzelberger et al. | |
| 2003/0019522 A1 | 1/2003 | Parunak | |
| 2003/0019833 A1 | 1/2003 | Unger et al. | |
| 2003/0061687 A1 | 4/2003 | Hansen et al. | |
| 2003/0080442 A1 | 5/2003 | Unger | |
| 2003/0089865 A1 | 5/2003 | Eldridge | |
| 2003/0096310 A1 | 5/2003 | Hansen et al. | |
| 2003/0106799 A1* | 6/2003 | Covington et al. | 204/600 |
| 2003/0152463 A1 | 8/2003 | Shuler et al. | |
| 2003/0231967 A1 | 12/2003 | Najafi et al. | |
| 2004/0073175 A1 | 4/2004 | Jacobson et al. | |
| 2004/0084647 A1 | 5/2004 | Beden et al. | |
| 2004/0086871 A1* | 5/2004 | Schembri | 435/6 |
| 2004/0115731 A1 | 6/2004 | Hansen et al. | |
| 2004/0179975 A1 | 9/2004 | Cox et al. | |
| 2004/0219732 A1 | 11/2004 | Burns et al. | |
| 2004/0248167 A1 | 12/2004 | Quake et al. | |
| 2005/0247356 A1 | 11/2005 | Welle | |
| 2005/0247357 A1 | 11/2005 | Welle | |
| 2005/0247358 A1 | 11/2005 | Welle | |
| 2005/0249607 A1 | 11/2005 | Klee | |
| 2005/0260081 A1 | 11/2005 | Tanaka et al. | |
| 2005/0284511 A1 | 12/2005 | Welle | |
| 2005/0284527 A1 | 12/2005 | Welle | |
| 2007/0227592 A1 | 10/2007 | Allen et al. | |

OTHER PUBLICATIONS

R. P. Welle, B. S. Hardy, and M. J. O'Brien, "The Peltier-Actuated Microvalve," Proceedings of the 23$^{rd}$ International Conference on Thermoelectrics, Adelaide, Jul. 27, 2004.

R. P. Welle and B. S. Hardy, "Peltier-Actuated Microvalve Performance Optimization," Proceedings of the 24th International Conference on Thermoelectrics, Clemson, Jun. 2005.

Ozaki, "Pumping mechanism using periodic phase changes of a fluid," Micro Electro Mechanical Systems, 1995, MEMS '95, Proceedings, IEEE, 31-36 (Jan. 29-Feb. 2, 1995).

* cited by examiner

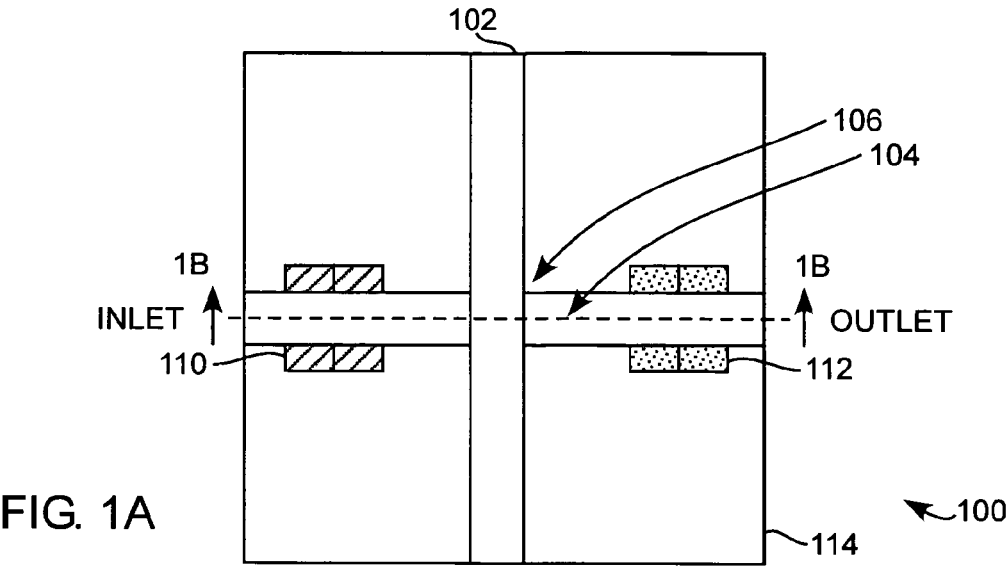
FIG. 1A
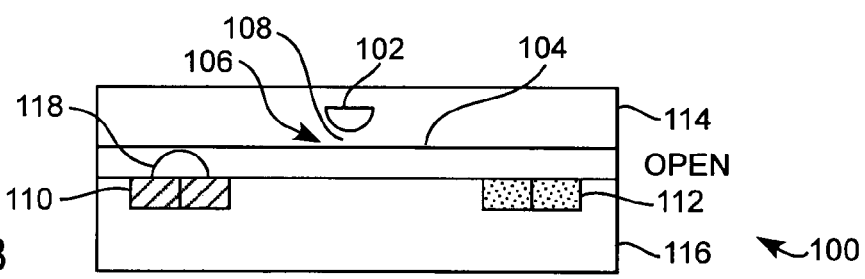
FIG. 1B
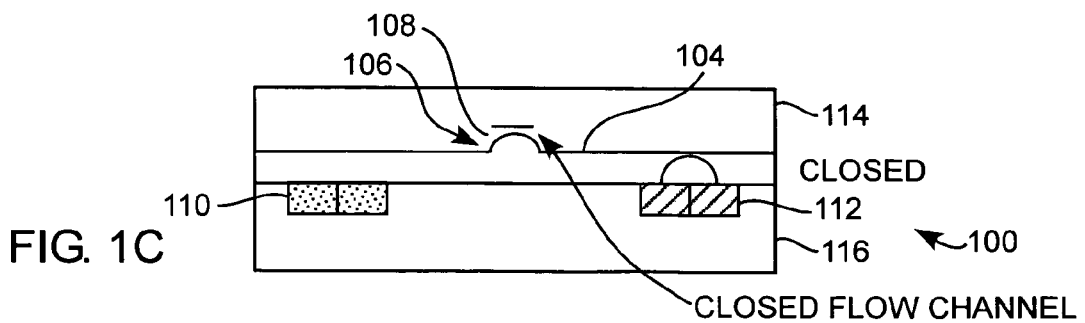
FIG. 1C
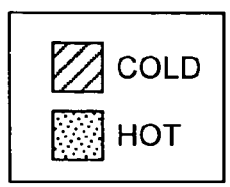
ELECTRO-HYDRAULIC VALVE

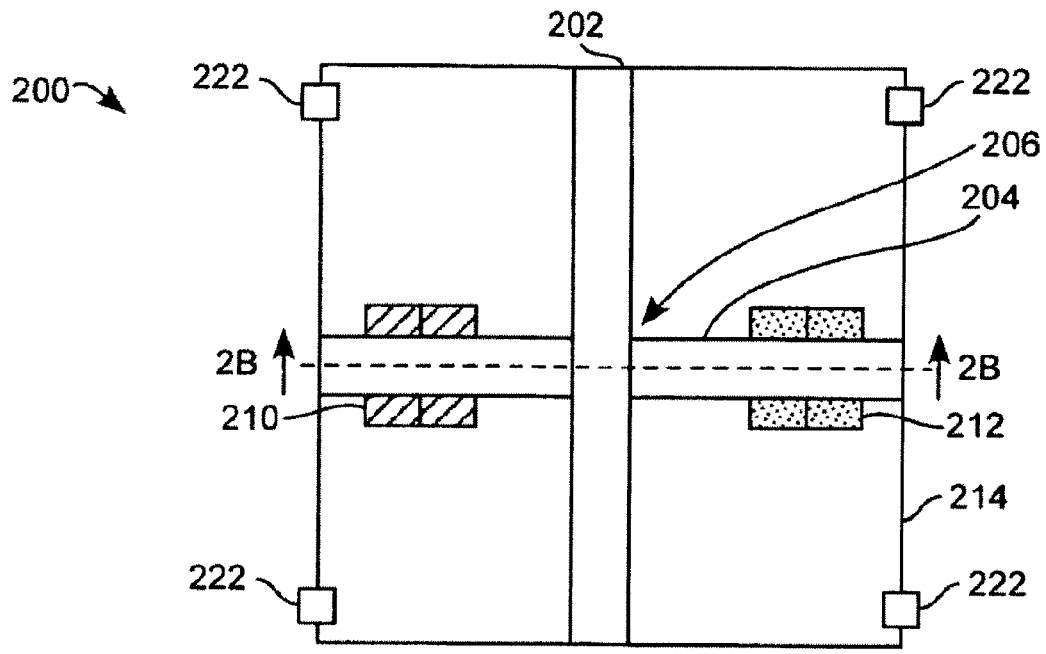
FIG. 2A
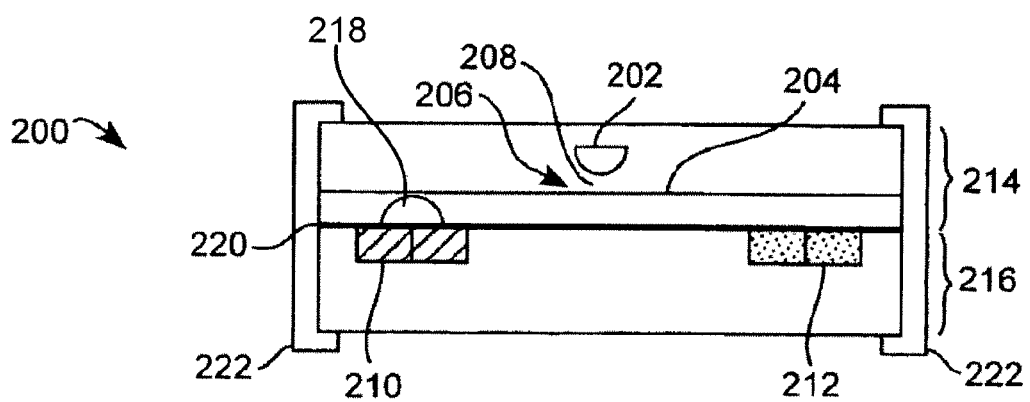
FIG. 2B
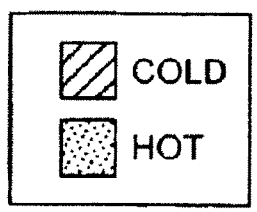
SEPARABLE ELECTRO-HYDRAULIC VALVE

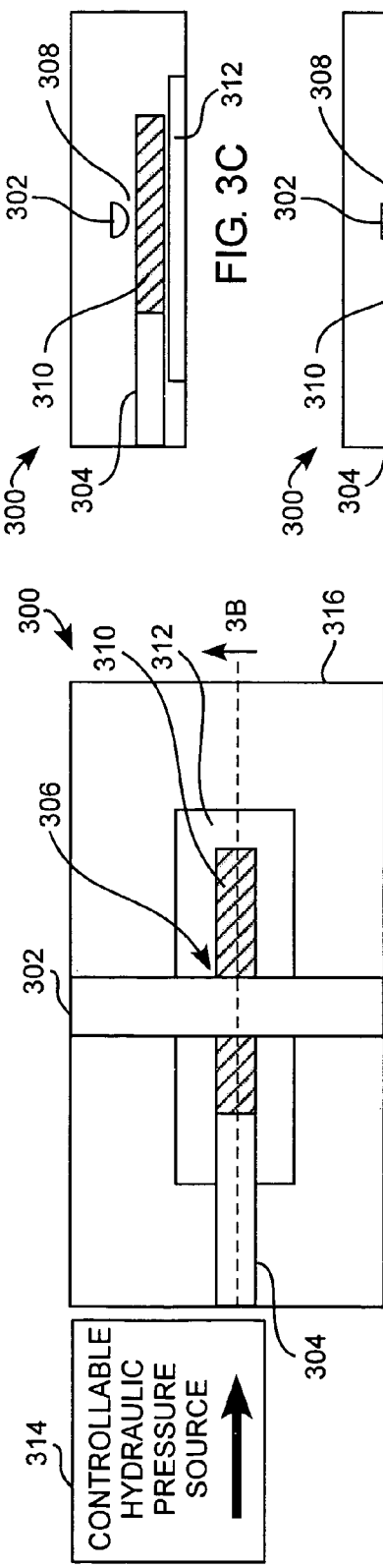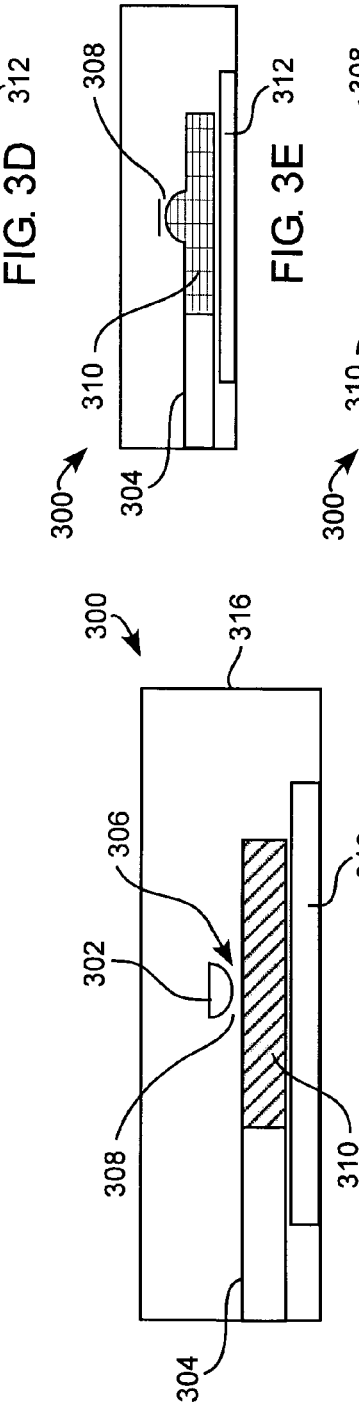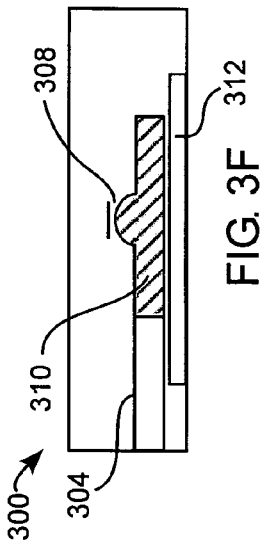
BI-STABLE ELECTRO-HYDRAULIC VALVE

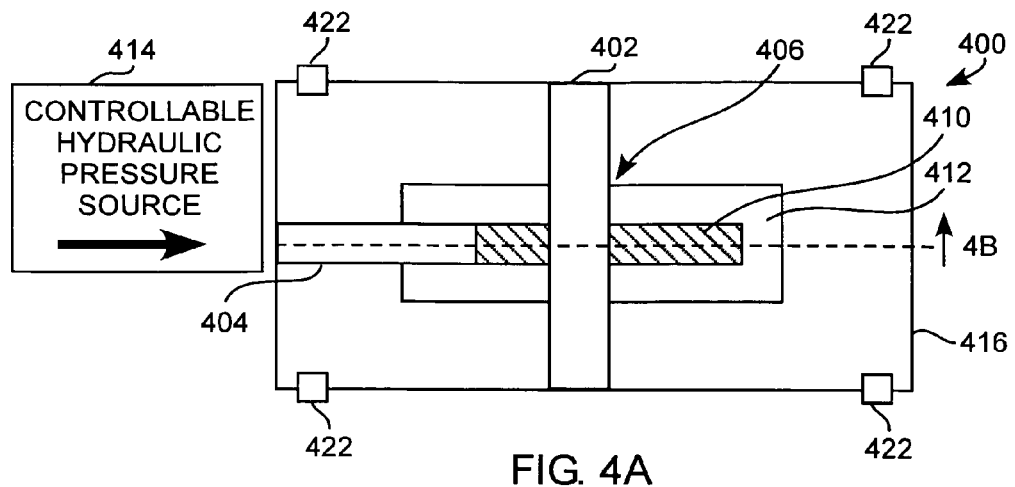
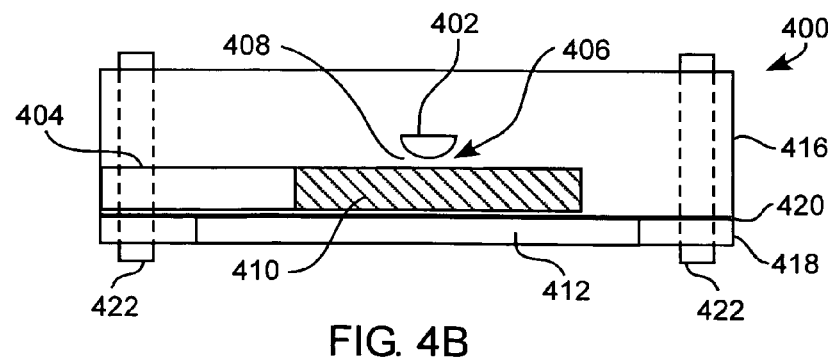
SEPARABLE BI-STABLE ELECTRO-HYDRAULIC VALVE

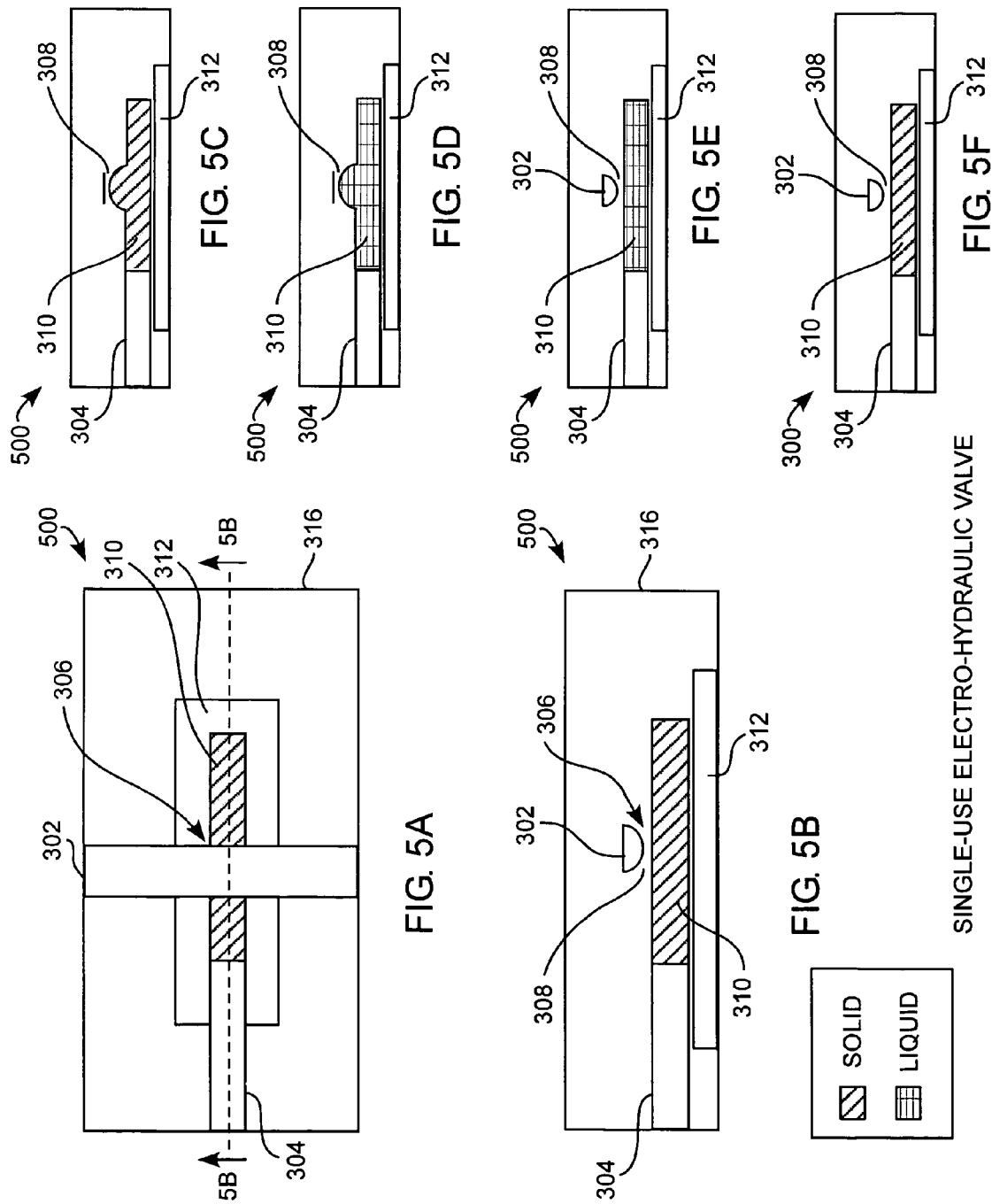

SEPARABLE SINGLE-USE ELECTRO-HYDRAULIC VALVE

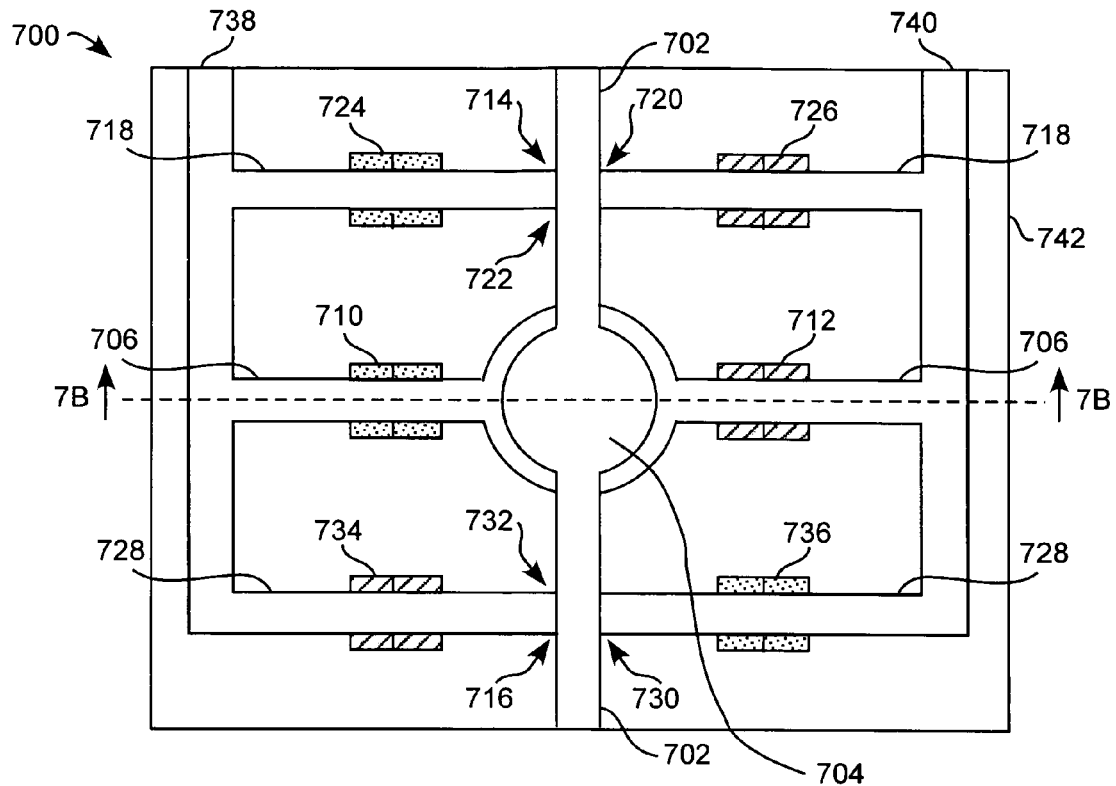
FIG. 7A
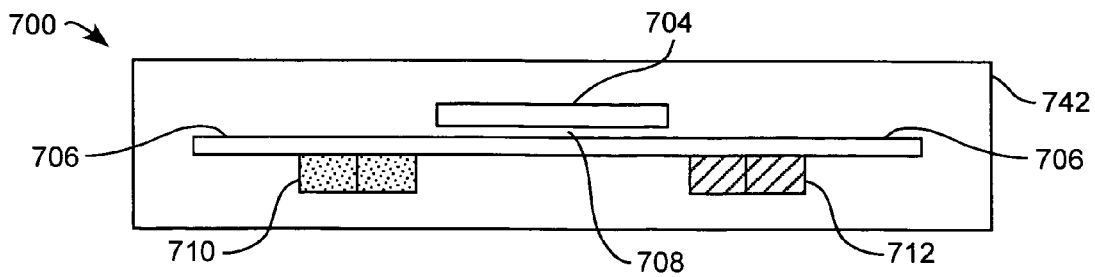
FIG. 7B
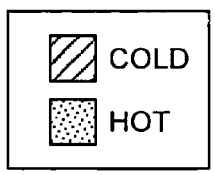
ELECTRO-HYDRAULIC PUMP

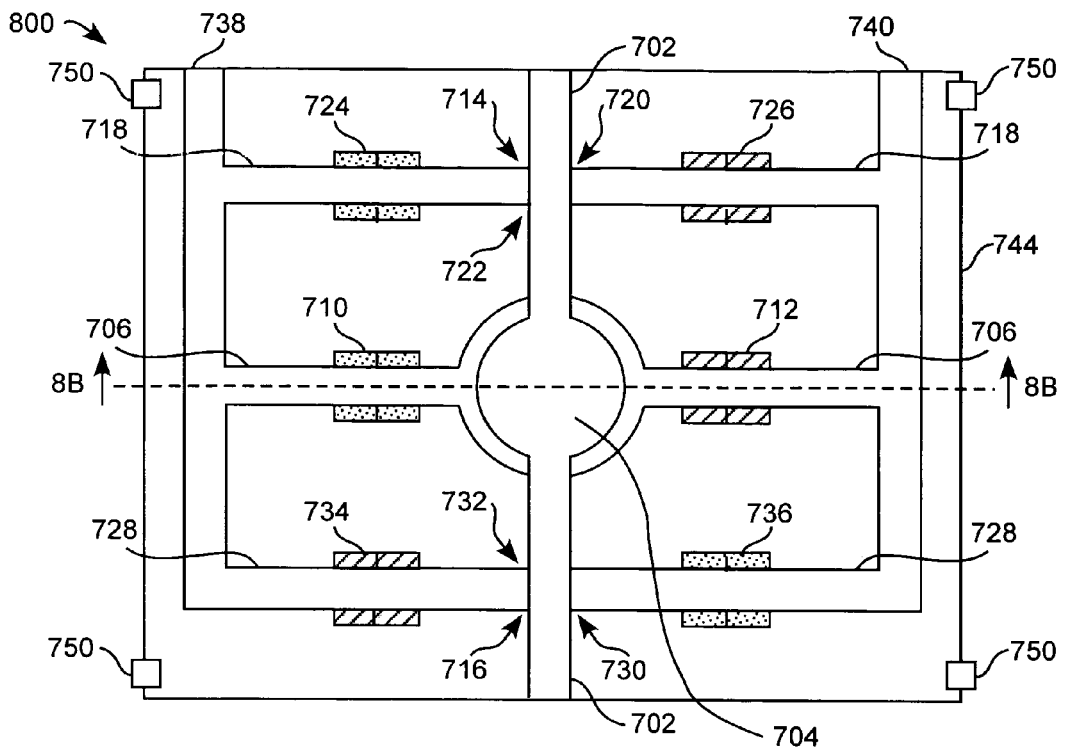
FIG. 8A
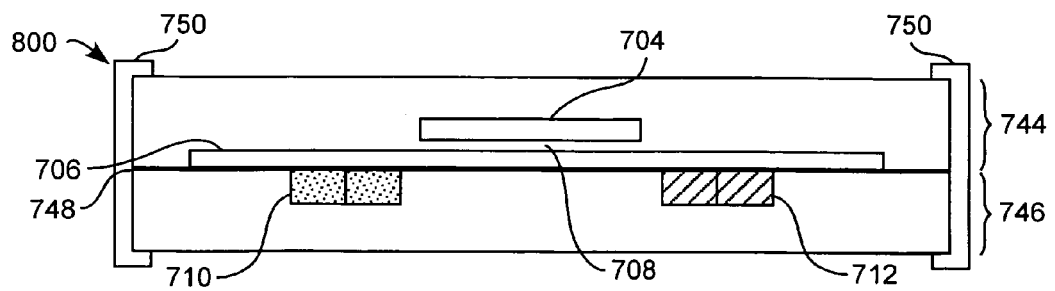
FIG. 8B
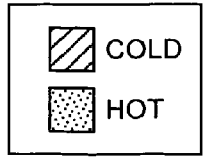
SEPARABLE ELECTRO-HYDRAULIC PUMP

ELECTRO-HYDRAULIC VALVE APPARATUSES

CROSS-REFERENCE TO RELATED APPLICATIONS

This application is a continuation-in-part of U.S. patent application Ser. No. 10/877,691 entitled "Microfluidic Devices With Separable Actuation and Fluid-Bearing Modules" filed on Jun. 24, 2004, which is incorporated herein by reference in its entirety, and a continuation-in-part of U.S. patent application Ser. No. 10/877,602 entitled "Microfluidic Valve Apparatuses With Separable Actuation and Fluid-Bearing Modules" filed on Jun. 24, 2004, which is incorporated herein by reference in its entirety.

This application is related to the following U.S. Patent Applications:

U.S. patent application Ser. No. 11/150,558, filed Jun. 9, 2005 and entitled "Electro-Hydraulic Devices," and U.S. patent application Ser. No. 10/843,515, filed May 10, 2004 and entitled "Phase-Change Valve Apparatuses."

TECHNICAL FIELD

The invention relates generally to devices and valves for controlling fluid or gas flow and, in particular, to electro-hydraulic devices and valves.

BACKGROUND ART

Developments in miniaturization and large-scale integration in fluidics have led to the concept of creating an entire chemistry or biology laboratory on a fluidic analog of the electronic microchip. Such integrated microfluidic devices (known as Micro Total Analysis Systems, or μTAS) are seen as key to automating and reducing costs in many biological analysis applications, including genetic analyses and medical diagnostics. Unlike the microelectronics industry, there is no general consensus in the analytical instruments industry about the most appropriate technologies for μTAS devices. Some companies are building μTAS devices by etching small glass plates or silicon chips. Others are working with either hard or soft polymeric materials fabricated by injection molding or by hot embossing. Producing reliable valves has turned out to be problematic with both types of devices. In etched solid chips, the valves tend to be very complicated, requiring multiple etching and deposition steps, and they suffer from a tendency to leak. Valves are easier to make in soft materials but, so far, they have been actuated only by pneumatic pressure, which presents difficulties for controlling the valves.

Traditional fluid valves operate by moving solid objects to obstruct the flow path. This requires sealing against a valve seat, and often leads to complicated geometries. Pneumatic valves used on μTAS devices are typically made by crossing two flow channels with a thin flexible membrane between them. One of the flow channels acts as a control to switch the flow on and off in the other channel. This is done by pressurizing the control channel, which leads to a deformation of the membrane separating the two channels. With a sufficiently high pressure in the control channel, the membrane completely closes the other channel. While this method has been shown to work for some applications, there are issues with the large number of pneumatic control lines required for large-scale integrated μTAS devices, as well as with concerns about leakage, and the limitations on operating pressure.

BRIEF DESCRIPTION OF THE DRAWINGS

FIG. 1A is a top view of an example embodiment of an electro-hydraulic valve (EHV);

FIGS. 1B and 1C are cross-sectional side views of the electro-hydraulic valve of FIG. 1A in open and closed configurations, respectively;

FIG. 2A is a top view of an example embodiment of a separable electro-hydraulic valve;

FIG. 2B is a cross-sectional side view of the separable electro-hydraulic valve of FIG. 2A;

FIG. 3A is a top view of an example embodiment of a bi-stable electro-hydraulic valve;

FIG. 3B is a cross-sectional side view of the bi-stable electro-hydraulic valve of FIG. 3A;

FIGS. 3C-3F show cross-sectional side views of the bi-stable electro-hydraulic valve of FIG. 3A during operation, transitioning from an open to a closed configuration;

FIG. 4A is a top view of an example embodiment of a separable bi-stable electro-hydraulic valve;

FIG. 4B is a cross-sectional side view of the separable bi-stable electro-hydraulic valve of FIG. 4A;

FIG. 5A is a top view of an example embodiment of a single-use electro-hydraulic valve;

FIG. 5B is a cross-sectional side view of the single-use electro-hydraulic valve of FIG. 5A shown after use;

FIGS. 5C-5F show cross-sectional side views of the single-use electro-hydraulic valve of FIG. 5A during operation, transitioning from a closed to an open configuration;

FIG. 7A is a top view of an example embodiment of an electro-hydraulic pump (EHP);

FIG. 7B is a cross-sectional side view of the electro-hydraulic pump of FIG. 7A;

FIG. 8A is a top view of an example embodiment of a separable electro-hydraulic pump;

FIG. 8B is a cross-sectional side view of the separable electro-hydraulic pump of FIG. 8A;

DISCLOSURE OF INVENTION

Figure 6A:
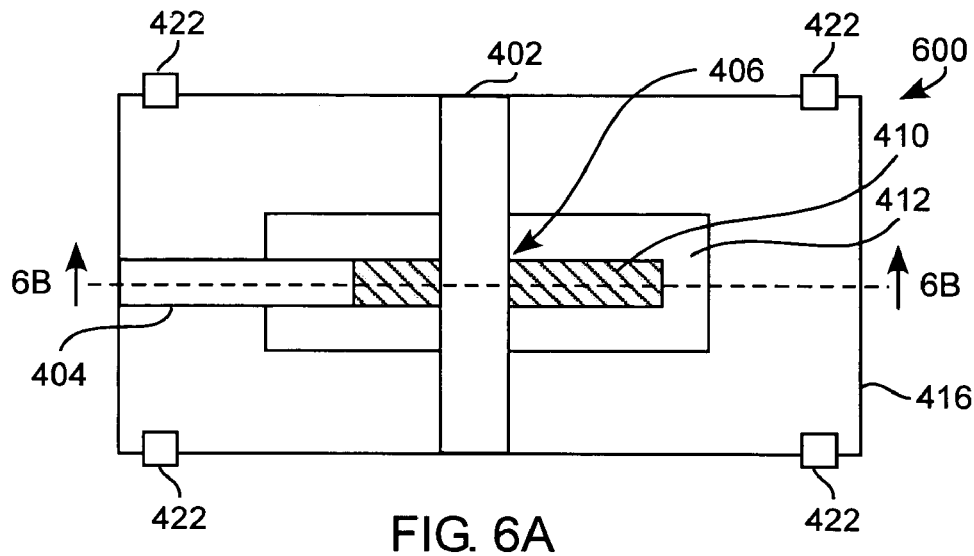
FIG. 6A is a top view of an example embodiment of a separable single-use electro-hydraulic valve.

For purposes of this description, a "microfluidic" device or valve has one or more channels with at least one dimension less than 1 mm.

Generally, the electro-hydraulic valves and other devices described herein embody electrically controlled mechanisms for applying hydraulic pressure or force at a valve junction. In some embodiments, a single hydraulic pressure source integrally formed on or operatively interfaced with an electro-hydraulic device is used to control multiple valve junctions in the device. In various embodiments, the electro-hydraulic valves and other devices can be used to valve liquids or gases.

Referring to FIGS. 1A-1C, an example embodiment of an electro-hydraulic valve (EHV) 100 includes a flow channel 102, and a hydraulic control channel 104 defining an electro-hydraulic valve junction 106 where the hydraulic control channel 104 is adjacent to the flow channel 102. In this example embodiment, the EHV 100 also includes a flexible wall 108 between the flow channel 102 and the hydraulic control channel 104 at the electro-hydraulic valve junction 106, and Peltier devices 110 and 112 (e.g., Peltier-actuated microvalves or other thermoelectric devices) adjacent to the hydraulic control channel 104 on opposite sides of the electro-hydraulic valve junction 106 for controllably applying a hydraulic force against the flexible wall 108 repositioning the flexible wall 108 in relation to the flow channel 102 to selectively close or open the EHV 100.

In an example embodiment, an electro-hydraulic valve is fabricated in an elastomeric material by creating two channels that cross one another but are separated by a thin membrane. (By way of example, materials suitable for the electro-hydraulic valve are described in U.S. Pat. No. 6,408,878, which is incorporated herein by reference.) One channel is the flow channel and the other is the hydraulic control channel. In an example embodiment, the flow channel and/or the hydraulic control channel has microfluidic dimensions. When the control channel is pressurized, the membrane separating the two channels is deformed such that it closes the flow channel. This prevents the flow of fluid (or other material) in the flow channel. This is illustrated in FIGS. 1B and 1C which show the EHV 100 in open and closed configurations, respectively. A pressure source for the control channel can be integrally formed with the device containing the electro-hydraulic valve, or external to the device and fluidically connected therewith. In an example embodiment, the pressure source includes an on-board hydraulic pump operatively connected to the hydraulic control channel. In an example embodiment, the pressure source includes an on-board, blow-down hydraulic pressure source operatively connected to the hydraulic control channel. It should be understood, however, that other pressure sources could be used.

In an example embodiment, the hydraulic control channel 104 is recessed into a first substrate 114, which also contains the flow channel 102 and the flexible wall 108. By way of example, the first substrate 114 is made of a material such as polydimethylsiloxane (PDMS) with a low thermal conductivity. In this example, the Peltier devices 110 and 112 are supported by a second substrate 116 which is bonded or otherwise secured to the first substrate 114.

The hydraulic control channel 104 is filled with a hydraulic fluid (water, for example) that can be easily frozen with the Peltier devices 110 and 112. As shown in FIG. 1B, the Peltier device 110 is controlled to freeze the hydraulic fluid into an ice plug 118, which closes the "upstream" Peltier valve. When the upstream Peltier valve is closed and the downstream Peltier valve is open (as shown in FIG. 1B), the control pressure at the electro-hydraulic valve junction 106 will be low and the electro-hydraulic valve 100 will be open. When the two Peltier valves are reversed, with the upstream Peltier valve open and the downstream Peltier valve closed (as shown in FIG. 1C), the control pressure at the electro-hydraulic valve junction 106 will be high, and the electro-hydraulic valve 100 will be closed.

According to various embodiments, an electro-hydraulic valve or other device is provided by two operatively interfaced modules, namely, a fluid-bearing module and a control module. The fluid-bearing module incorporates fluid transport/containment elements and other elements that may come into contact with fluids. The control module incorporates actuation mechanisms for fluid transport and control. The two modules are brought together into contact for use. The modules are detachably secured to each other thereby allowing the fluid-bearing module, when it is no longer needed, to be separated from the control module and disposed of. The control module, on the other hand, is reusable with another fluid-bearing module, eliminating in many instances the possibility of cross-contamination between fluids in the two fluid-bearing modules.

Referring to FIGS. 2A and 2B, an example embodiment of a separable electro-hydraulic valve (EHV) 200 includes a flow channel 202, and a hydraulic control channel 204 defining an electro-hydraulic valve junction 206 where the hydraulic control channel 204 is adjacent to the flow channel 202. In this example embodiment, the separable EHV 200 also includes a flexible wall 208 between the flow channel 202 and the hydraulic control channel 204 at the electro-hydraulic valve junction 206, and Peltier devices 210 and 212 (e.g., Peltier-actuated microvalves or other thermoelectric devices) adjacent to the hydraulic control 204 on opposite sides of the electro-hydraulic valve junction 206 for controllably applying a hydraulic force against the flexible wall 208 for repositioning the flexible wall 208 in relation to the flow channel 202 to selectively close or open the separable EHV 200.

In this example embodiment, the flow channel 202 and the hydraulic control channel 204 are formed in a fluid-bearing module 214, and the Peltier devices 210 and 212 are part of a control module 216 that is detachably secured to the fluid-bearing module 214. In this example embodiment, the fluid-bearing module 214 also includes a cover layer 220, which encloses the hydraulic control channel 204. For example, the cover layer 220 is a thin membrane of a material with a relatively high thermal conductivity (for example, 2-micron-thick stainless steel). If the fluid-bearing module 214 is covered by a layer of electrically conducting material, then either the fluid-bearing module 214, or the control module 216, or both, must be coated with an electrically insulating layer, glass for example, to prevent a short across the Peltier junctions. Additionally, the control module 216 can be coated with a protective layer (e.g., a disposable protective layer or an easily-cleaned protective layer) to facilitate restoring the cleanliness of the control module 216 in the event it should become contaminated with fluids.

The hydraulic control channel 204 is filled with a hydraulic fluid (water, for example) that can be easily frozen with the Peltier devices 210 and 212. To operate the separable electro-hydraulic valve 200, the fluid-bearing module 214 is brought into contact with the control module 216 such that the hydraulic control channel 204 is in good thermal contact with the Peltier junctions. As shown in FIG. 2B, the Peltier device 210 is controlled to freeze the hydraulic fluid into an ice plug 218, which closes the "upstream" Peltier valve. When the upstream Peltier valve is closed and the downstream Peltier valve is open (as shown in FIG. 2B), the control pressure at the electro-hydraulic valve junction 206 will be low and the separable electro-hydraulic valve 200 will be open. When the two Peltier valves are reversed, with the upstream Peltier valve open and the downstream Peltier valve closed, the control pressure at the electro-hydraulic valve junction 206 will be high, and the separable electro-hydraulic valve 200 will be closed.

In this example embodiment, the fluid-bearing module 214 and the control module 216 are detachably secured together with a clamp mechanism 222. For the separable electro-hydraulic valve 200 and its components, proper operation of the components requires that the fluid-bearing module 214 be in good thermal and/or mechanical contact with the control module 216. In this example, the fluid-bearing module 214 is held in place on the control module 216 by the clamp mechanism 222. It should be noted, however, that if the fluid-bearing module 214 is fabricated using a flexible material such as polydimethylsiloxane elastomer (PDMS), for example, it might be possible to trap small air bubbles between the two modules, which may limit thermal conduction across the interface. In an alternative configuration for assembling the two modules, the control module 216 is provided with a plurality of small holes in the surface of the control module 216 that mate with the fluid-bearing module 214. The holes are connected to a vacuum source (not shown). When the two modules are mated, a seal is created at the edge of the interface (with an o-ring, for example), and the vacuum source is used to remove air from the space between the two modules. The resulting vacuum ensures good thermal contact while also holding the two modules together.

Materials, dimensions, and operational details of the electro-hydraulic valve 100 are also suitable for corresponding components of the separable electro-hydraulic valve 200 and, therefore, are not in every instance discussed again with reference to FIGS. 2A and 2B and subsequently described embodiments.

In various embodiments, a bi-phase material is utilized to provide a bi-stable electro-hydraulic valve. Referring to FIGS. 3A and 3B, an example embodiment of an electro-hydraulic valve (EHV) 300 includes a flow channel 302, and a hydraulic control channel 304 (filled with a hydraulic fluid such as water) defining an electro-hydraulic valve junction 306 where the hydraulic control channel 304 is adjacent to the flow channel 302. In this example embodiment, the EHV 300 also includes a flexible wall 308 between the flow channel 302 and the hydraulic control channel 304 at the electro-hydraulic valve junction 306, a bi-phase material 310 (e.g., paraffin wax) within the hydraulic control channel 304 adjacent to the electro-hydraulic valve junction 306, and a heating/cooling element 312 adjacent to the bi-phase material 310, the heating/cooling element 312 being controllable to generate sufficient energy to cause the bi-phase material 310 to transition from a solid phase to a liquid phase. In this example embodiment, the heating/cooling element 312 covers (or is otherwise thermally connected with) the entire portion of the hydraulic control channel 304 where the bi-phase material 310 is located. In this example embodiment, the EHV 300 also includes a hydraulic pressure source 314 operatively connected to the hydraulic control channel 304 for controllably applying a hydraulic force against the bi-phase material 310 repositioning the flexible wall 308 in relation to the flow channel 302 to selectively close or open the EHV 300 when the bi-phase material 310 is in the liquid phase. The hydraulic pressure source 314 can be integrally formed with, or external to, the EHV 300. In an example embodiment, the hydraulic pressure source 314 is an on-board hydraulic pump. In another example embodiment, the hydraulic pressure source 314 is an on-board, blow-down hydraulic source. It should be understood, however, that other pressure sources could be used.

In an example embodiment, the hydraulic control channel 304 is recessed into a substrate 316, which also contains the flow channel 302 and the flexible wall 308. By way of example, the substrate 316 is made of a material such as polydimethylsiloxane (PDMS) with a low thermal conductivity. In an example embodiment, the flow channel 302 and/or the hydraulic control channel 304 has microfluidic dimensions.

FIGS. 3C-3F show cross-sectional side views of the bi-stable electro-hydraulic valve 300 during operation, transitioning from an open to a closed configuration. In FIG. 3C, the EHV 300 is in its open state, and the bi-phase material 310 is solid. To close the EHV 300, first the heating/cooling element 312 is used to melt the bi-phase material 310 (as shown in FIG. 3D) by heating the region of the hydraulic control channel 304 occupied by the bi-phase material 310 to a temperature above the melting point of the bi-phase material 310. Next, the hydraulic pressure source 314 is used to pump the hydraulic fluid within the hydraulic control channel 304 imparting hydraulic pressure against the bi-phase material 310 such that the bi-phase material 310 is repositioned in relation to a flow channel 302. More specifically, the liquid bi-phase material 310 is pushed against the flexible wall 308 at the electro-hydraulic valve junction 306, deforming and extending the flexible wall 308 toward the flow channel 302 resulting in closure of the flow channel 302 (as shown in FIG. 3E). The heating/cooling element 312 is then used to cool or remove heat from the bi-phase material 310, allowing the bi-phase material 310 to solidify with the flexible wall 308 extended upward (as shown in FIG. 3F). After the bi-phase material has solidified, the hydraulic pressure can be relaxed.

In an example embodiment, in either the open or closed state, the bi-phase material 310 is normally solid; it is heated to its melting point only for the purpose of switching the state of the EHV 300. To reopen the EHV 300, the heating/cooling element 312 is again used to melt the bi-phase material 310. The hydraulic pressure exerted by the hydraulic pressure source 314 is removed (or lessened) allowing the flexible surface 308 to resume its relaxed state (i.e., not distended into the flow channel 302) thus pushing the liquid bi-phase material 310 back toward the hydraulic control channel 304 to open up the valve. The EHV 300 can be repeatedly cycled by appropriately controlling the heating/cooling element 312 and the hydraulic pressure source 314.

In an example embodiment, an electro-hydraulic valving method includes: melting a bi-phase material; increasing a hydraulic pressure against the bi-phase material such that the bi-phase material is repositioned in relation to a flow channel of an electro-hydraulic valve apparatus to close the electro-hydraulic valve apparatus; and solidifying the bi-phase material.

In another example embodiment, an electro-hydraulic valving method includes: melting a bi-phase material; decreasing a hydraulic pressure against the bi-phase material such that the bi-phase material is repositioned in relation to a flow channel of an electro-hydraulic valve apparatus to open the electro-hydraulic valve apparatus; and solidifying the bi-phase material.

Referring to FIGS. 4A and 4B, an example embodiment of a separable bi-stable electro-hydraulic valve (EHV) 400 includes a flow channel 402, and a hydraulic control channel 404 (filled with a hydraulic fluid such as water) defining an electro-hydraulic valve junction 406 where the hydraulic control channel 404 is adjacent to the flow channel 402. In this example embodiment, the EHV 400 also includes a flexible wall 408 between the flow channel 402 and the hydraulic control channel 404 at the electro-hydraulic valve junction 406, a bi-phase material 410 (e.g., paraffin wax) within the hydraulic control channel 404 adjacent to the electro-hydraulic valve junction 406, and a heating/cooling element 412 adjacent to the bi-phase material 410, the heating/cooling element 412 being controllable to generate sufficient energy to cause the bi-phase material 410 to transition from a solid phase to a liquid phase. In this example embodiment, the heating/cooling element 412 covers (or is otherwise thermally connected with) the entire portion of the hydraulic control channel 404 where the bi-phase material 410 is located. In this example embodiment, the EHV 400 also includes a hydraulic pressure source 414 operatively connected to the hydraulic control channel 404 for controllably applying a hydraulic force against the bi-phase material 410 repositioning the flexible wall 408 in relation to the flow channel 402 to selectively close or open the EHV 400 when the bi-phase material 410 is in the liquid phase. The hydraulic pressure source 414 can be integrally formed with, or external to, the EHV 400. In an example embodiment, the hydraulic pressure source 414 is an on-board hydraulic pump. In another example embodiment, the hydraulic pressure source 414 is an on-board, blow-down hydraulic source. It should be understood, however, that other pressure sources could be used.

In this example embodiment, the flow channel 402 and the hydraulic control channel 404 are formed in a fluid-bearing module 416, and the heating/cooling element 412 is part of a control module 418 that is detachably secured to the fluid-bearing module 416. In an example embodiment, the fluid-bearing module 416 includes an elastomeric material. In this example embodiment, the fluid-bearing module 416 also includes a cover layer 420, which encloses the hydraulic control channel 404 and the bi-phase material 410. For example, the cover layer 420 is a thin membrane of a material with a relatively high thermal conductivity (for example, 2-micron-thick stainless steel). If the fluid-bearing module 416 is covered by a layer of electrically conducting material, then either the fluid-bearing module 416, or the control module 418, or both, must be coated with an electrically insulating layer, glass for example, if components of the heating/cooling element 412 require protection from being electrically shorted together. Additionally, the control module 418 can be coated with a protective layer (e.g., a disposable protective layer or an easily-cleaned protective layer) to facilitate restoring the cleanliness of the control module 418 in the event it should become contaminated with fluids.

The hydraulic control channel 404 is filled with a hydraulic fluid (water, for example) that can be pumped to impart a hydraulic force against the bi-phase material 410. To operate the EHV 400, the fluid-bearing module 416 is brought into contact with the control module 418 such that the portion of the hydraulic control channel 404 containing the bi-phase material 410 is in good thermal contact with the heating/cooling element 412.

In this example embodiment, the fluid-bearing module 416 and the control module 418 are detachably secured together with a clamp mechanism 422. For the separable bi-stable electro-hydraulic valve 400 and its components, proper operation of the components requires that the fluid-bearing module 416 be in good thermal and/or mechanical contact with the control module 418. In this example, the fluid-bearing module 416 is held in place on the control module 418 by the clamp mechanism 422. It should be noted, however, that if the fluid-bearing module 416 is fabricated using a flexible material such as polydimethylsiloxane elastomer (PDMS), for example, it might be possible to trap small air bubbles between the two modules, which may limit thermal conduction across the interface. In an alternative configuration for assembling the two modules, the control module 418 is provided with a plurality of small holes in the surface of the control module 418 that mate with the fluid-bearing module 416. The holes are connected to a vacuum source (not shown). When the two modules are mated, a seal is created at the edge of the interface (with an o-ring, for example), and the vacuum source is used to remove air from the space between the two modules. The resulting vacuum ensures good thermal contact while also holding the two modules together.

In some applications, it may be desirable to store fluids in a storage cell on a device (e.g., a microfluidic device) for an extended period until the device is needed. When the device is used, the fluids are released, for example, to act as reagents for analyzing a sample. Once the fluids have been released and used, there is no need to re-seal the storage cell. For such applications it would be useful to have a single-use bi-stable valve.

In various embodiments, valve apparatuses are configured such that they remain closed until actuated, and then switch to an open position and remain there. By way of example, such "single use" valve apparatuses can be used to seal fluids into a closed volume (e.g., storage of fluids on a microfluidic device) for long periods of time. FIGS. 5A-5F illustrate an example embodiment of a single-use electro-hydraulic valve (EHV) 500, which is similar to the EHV 300 (FIGS. 3A-3F) except as now described. In this example embodiment, the bi-phase material 310 is initially provided in a solidified form that pushes the flexible wall 308 into the flow channel 302 at the electro-hydraulic valve junction 306 such that the flexible wall 308 obstructs flow through the flow channel 302 (as shown in FIG. 5C). The bi-phase material 310, in its initial solid phase, also fills the portion of the hydraulic control channel 304 adjacent to the heating/cooling element 312. In contrast to the bi-stable EHV 300, the single-use EHV 500 does not require a controllable hydraulic source. Instead, the control channel 304 is connected to an un-pressurized volume. To actuate the EHV 500, the heating/cooling element 312 is used to melt the bi-phase material 310 (as shown in FIG. 5D). In the absence of a hydraulic pressure source the bi-phase material 310, when liquid, is free to flow, allowing the flexible wall 308 to assume its relaxed state (i.e., not distended into the flow channel 302) thus pushing the liquid bi-phase material 310 back toward the hydraulic control channel 304 to open up the valve (as shown in FIG. 5E). With the flow channel 302 now open, the heating/cooling element 312 can be used (e.g., turned off) allowing the bi-phase material 310 to return to its solid state (as shown in FIG. 5F).

In an example embodiment, an electro-hydraulic valve apparatus includes: a flow channel; a hydraulic control channel defining an electro-hydraulic valve junction where the hydraulic control channel is adjacent to the flow channel; a flexible wall between the flow channel and the hydraulic control channel at the electro-hydraulic valve junction; a bi-phase material within the hydraulic control channel adjacent to the electro-hydraulic valve junction, the bi-phase material being in a solid phase and shaped such that the bi-phase material extends the flexible wall into the flow channel to close the flow channel; and a heating/cooling element adjacent to the bi-phase material, the heating/cooling element being controllable to generate sufficient energy to cause the bi-phase material to transition from the solid phase to a liquid phase removing a hydraulic force being applied by the bi-phase material against the flexible wall allowing the flexible wall to retract from the flow channel to open the electro-hydraulic valve apparatus.

Figure 6B:
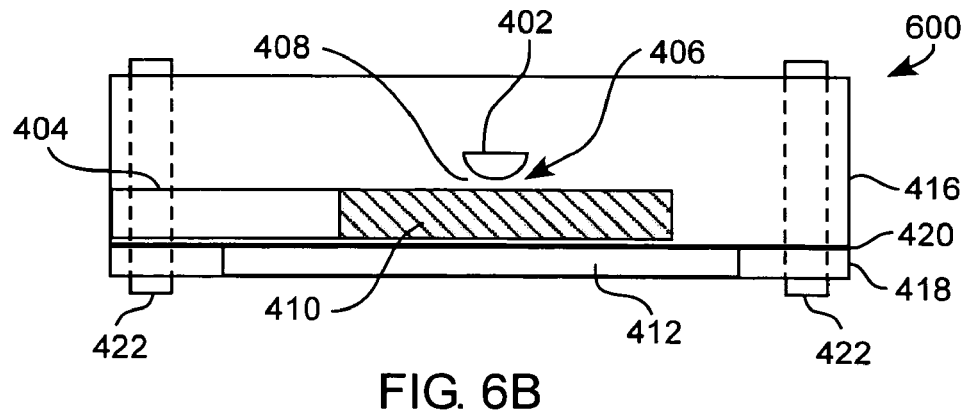
FIG. 6B is a cross-sectional side view of the separable single-use electro-hydraulic valve of FIG. 6A shown after use.

FIGS. 6A and 6B illustrate an example embodiment of a separable single-use electro-hydraulic valve (EHV) 600 which is similar to the EHV 400 (FIGS. 4A and 4B) and operates as described with reference to the EHV 500 (FIGS. 5A-5F).

In an example embodiment, an electro-hydraulic valve apparatus includes: a flow channel with a flexible wall; a hydraulic control channel defining an electro-hydraulic valve junction where the hydraulic control channel is adjacent to the flexible wall; and means for controllably applying a hydraulic force against the flexible wall repositioning the flexible wall in relation to the flow channel to selectively close or open the electro-hydraulic valve apparatus; wherein the flow channel and the hydraulic control channel are formed in a fluid-bearing module, and the means for controllably applying a hydraulic force is part of a control module that is detachably secured to the fluid-bearing module.

In an example embodiment, the flow channel and/or hydraulic control channel has microfluidic dimensions. In an example embodiment, the hydraulic control channel includes a hydraulic fluid (e.g., water) for imparting the hydraulic force. In an example embodiment, the means for controllably applying a hydraulic force includes Peltier devices adjacent to the hydraulic control channel on opposite sides of the electro-hydraulic valve junction. In an example embodiment, the means for controllably applying a hydraulic force includes a bi-phase material within the hydraulic control channel and a heating/cooling element adjacent to the bi-phase material. In an example embodiment, the fluid-bearing module includes an elastomeric material. In an example embodiment, the electro-hydraulic valve apparatus further includes a hydraulic pressure source operatively connected to the hydraulic control channel. In an example embodiment, the electro-hydraulic valve apparatus further includes an on-board hydraulic pump operatively connected to the hydraulic control channel. In an example embodiment, the electro-hydraulic valve apparatus further includes an on-board, blow-down hydraulic pressure source operatively connected to the hydraulic control channel.

FIGS. 7A and 7B illustrate an example embodiment of an electro-hydraulic pump (EHP) 700. In this example embodiment, the EHP 700 includes a flow channel 702 including a variable volume cell 704, a hydraulic pump control channel 706 adjacent to the variable volume cell 704, a flexible pump wall 708 between the flow channel 702 and the variable volume cell 704, and a first pair of Peltier devices 710 and 712 adjacent to the hydraulic pump control channel 706 on opposite sides of the variable volume cell 704 for controllably applying a hydraulic pumping force to the flexible wall 708 to control a volume of the variable volume cell 704.

In an example embodiment, the EHP 700 also includes electro-hydraulic valve apparatuses 714 and 716 adjacent to the flow channel 702 on opposite sides of the variable volume cell 704 for controlling flow to and from the variable volume cell 704. In the illustrated example embodiment, the electro-hydraulic valve apparatus 714 includes a hydraulic valve control channel 718 defining an electro-hydraulic valve junction 720 where the hydraulic valve control channel 718 is adjacent to the flow channel 702, a flexible valve wall 722 between the flow channel 702 and the hydraulic valve control channel 718 at the electro-hydraulic valve junction 720, and a second pair of Peltier devices 724 and 726 adjacent to the hydraulic valve control channel 718 on opposite sides of the electro-hydraulic valve junction 720 for controllably applying a hydraulic valving force against the flexible valve wall 722 repositioning the flexible valve wall 722 in relation to the flow channel 702 to selectively close or open the electro-hydraulic valve apparatus 714. Similarly, in the illustrated example embodiment, the electro-hydraulic valve apparatus 716 includes a hydraulic valve control channel 728 defining an electro-hydraulic valve junction 730 where the hydraulic valve control channel 728 is adjacent to the flow channel 702, a flexible valve wall 732 between the flow channel 702 and the hydraulic valve control channel 728 at the electro-hydraulic valve junction 730, and a second pair of Peltier devices 734 and 736 adjacent to the hydraulic valve control channel 728 on opposite sides of the electro-hydraulic valve junction 730 for controllably applying a hydraulic valving force against the flexible valve wall 732 repositioning the flexible valve wall 732 in relation to the flow channel 702 to selectively close or open the electro-hydraulic valve apparatus 716. In an example embodiment, the flow channel 702 and/or one or more of the hydraulic pump control channel 706 and the hydraulic valve control channels 718 and 728 have microfluidic dimensions. In an example embodiment, one or more of the hydraulic pump control channel 706 and the hydraulic valve control channels 718 and 728 include a hydraulic fluid (e.g., water) for imparting the hydraulic forces.

In an example embodiment, the flexible pump wall 708 and one or more of the flexible valve walls 722 and 732 are part of an integrally formed flexible member. In an example embodiment, one or more of the hydraulic pump control channel 706 and the hydraulic valve control channels 718 and 728 are fluidically interconnected. In an example embodiment, such a fluidic interconnection includes control channels 738 and 740 (e.g., a control channel in and a control channel out, respectively) as shown. In an example embodiment, the EHP 700 also includes a hydraulic pressure source (not shown in FIGS. 7A and 7B), such as an on-board hydraulic pump, or an on-board, blow-down hydraulic source, operatively connected to one or more of the hydraulic pump control channel 706 and the hydraulic valve control channels 718 and 728. The hydraulic pressure source can be integrally formed with, or external to, the EHP 700. It should be understood, however, that other pressure sources could be used.

In this illustrated example embodiment, the components of the EHP 700 are formed or supported within a substrate 742. By way of example, the substrate 742 is made of a material such as polydimethylsiloxane (PDMS) with a low thermal conductivity.

In operation, hydraulic fluid enters at the control channel 738 and exits from the control channel 740. The Peltier devices 710 and 712 are controlled to regulate the amount of hydraulic pressure against the flexible wall 708, which, in turn, controls the volume of the variable volume cell 704. Changes in the volume of the variable volume cell 704 draw material into, or force material out of, the variable volume cell 704. The electro-hydraulic valve apparatuses 714 and 716 are controlled (as described above with reference to the EHV 100) to regulate the flow of material being provided to the variable volume cell 704 and the flow of material being pumped out of the variable volume cell 704.

FIGS. 8A and 8B illustrate an example embodiment of a separable electro-hydraulic pump (EHP) 800. In this example embodiment, the EHP 800 is similar to the EHP 700 except as described below.

In this example embodiment, components of the EHP 800 (e.g., the flow channel 702, the hydraulic pump control channel 706 and the hydraulic valve control channels 718 and 728) are formed in a fluid-bearing module 744, and the Peltier devices 710, 712, 724, 726, 734 and 736 are part of a control module 746 that is detachably secured to the fluid-bearing module 744. In an example embodiment, the fluid-bearing module 744 includes one or more of the flexible pump wall 708 and the flexible valve walls 722 and 732. In an example embodiment, the fluid-bearing module 744 includes an elastomeric material. In this example embodiment, the fluid-bearing module 744 also includes a cover layer 748, which encloses the hydraulic pump control channel 706 and the hydraulic valve control channels 718 and 728. For example, the cover layer 748 is a thin membrane of a material with a relatively high thermal conductivity (for example, 2-micron-thick stainless steel). If the fluid-bearing module 744 is covered by a layer of electrically conducting material, then either the fluid-bearing module 744, or the control module 746, or both, must be coated with an electrically insulating layer, glass for example, to prevent a short across the Peltier junctions. Additionally, the control module 746 can be coated with a protective layer (e.g., a disposable protective layer or an easily-cleaned protective layer) to facilitate restoring the cleanliness of the control module 746 in the event it should become contaminated with fluids.

To operate the EHP 800, the fluid-bearing module 744 is brought into contact with the control module 746 such that the hydraulic pump control channel 706 and the hydraulic valve control channels 718 and 728 are in good thermal contact with their respective Peltier junctions.

In this example embodiment, the fluid-bearing module 744 and the control module 746 are detachably secured together with a clamp mechanism 750. For the EHP 800 and its components, proper operation of the components requires that the fluid-bearing module 744 be in good thermal and/or mechanical contact with the control module 746. The example techniques described above for detachably securing modules together are also applicable to the EHP 800.

Figure 9:
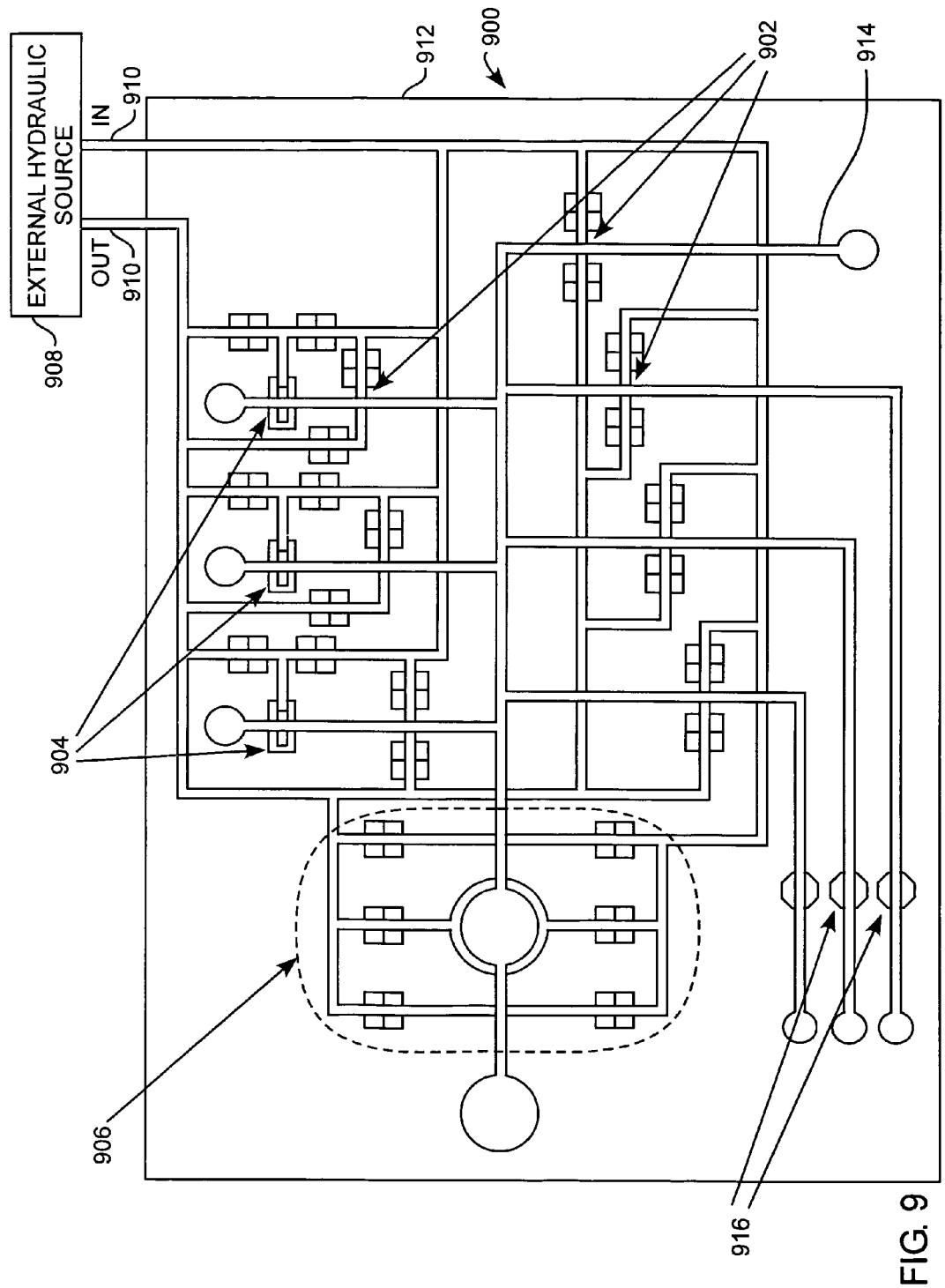
FIG. 9 is a top view of an example embodiment of an integrated microfluidic circuit incorporating EHVs, bi-stable EHVs, and an EHP, and using a single external hydraulic source.

FIG. 9 illustrates an example embodiment of an integrated microfluidic circuit 900. In this example embodiment, the integrated microfluidic circuit 900 includes EHVs 902 (such as the EHV 100), bi-stable EHVs 904 (such as the bi-stable EHV 300), and an EHP 906 (such as the EHP 700). In this example embodiment, an external hydraulic source 908 (e.g., a single external hydraulic source) is operatively connected to hydraulic control channels 910. In this example embodiment, a substrate 912 includes the EHV, EHP and other components, as well as flow channels 914. It should be understood that a given substrate could be provided with various combinations of EHVs and EHPs, as well as other components such as sensors 916.

Figure 10:
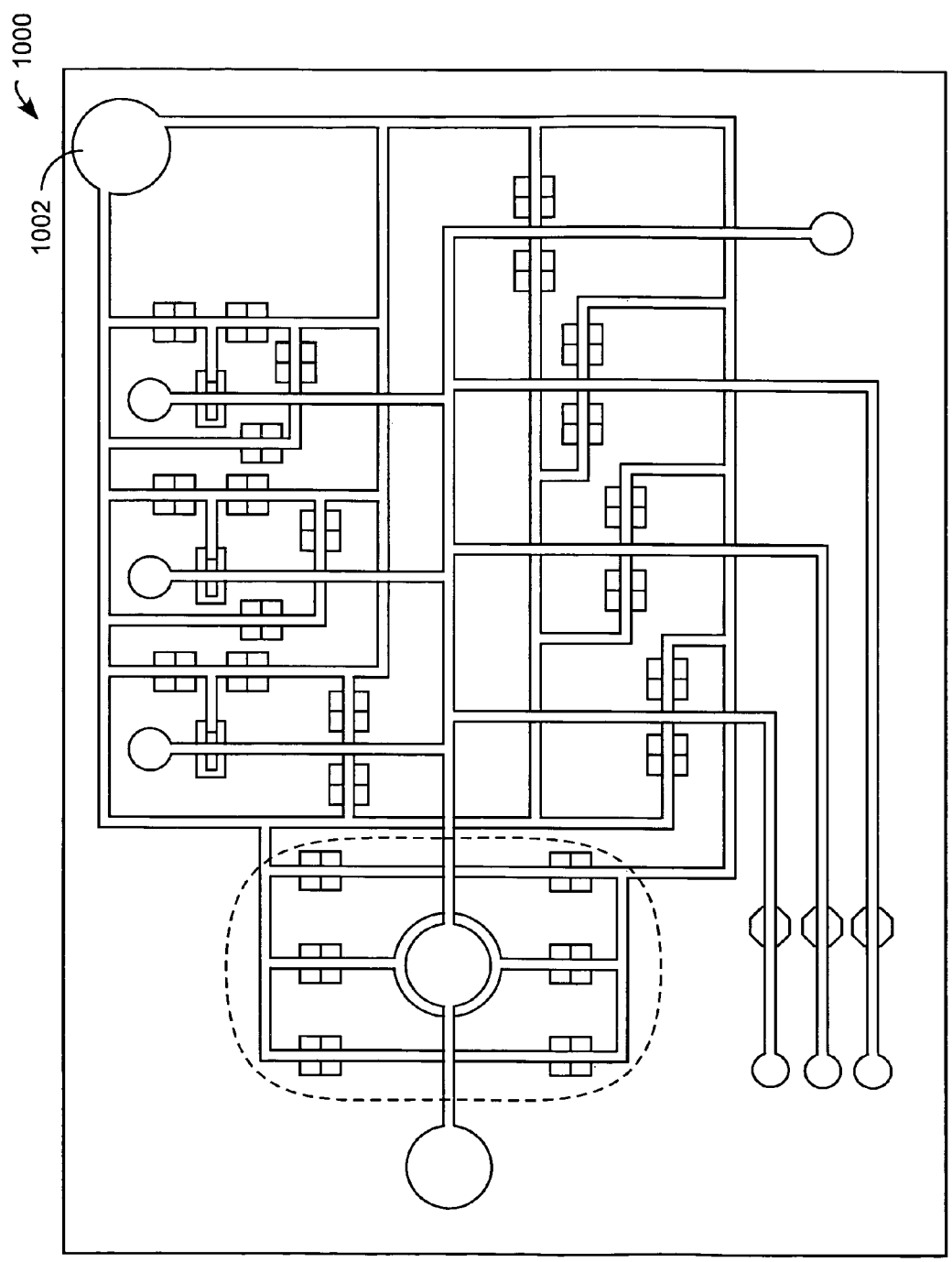
FIG. 10 is a top view of an example embodiment of an integrated microfluidic circuit incorporating EHVs, bi-stable EHVs, and an EHP, and using a single on-board hydraulic pump.

FIG. 10 illustrates an example embodiment of an integrated microfluidic circuit 1000 similar to the integrated microfluidic circuit 900, except that the external hydraulic source 908 is replaced with an on-board hydraulic pump 1002 as shown.

Figure 11:
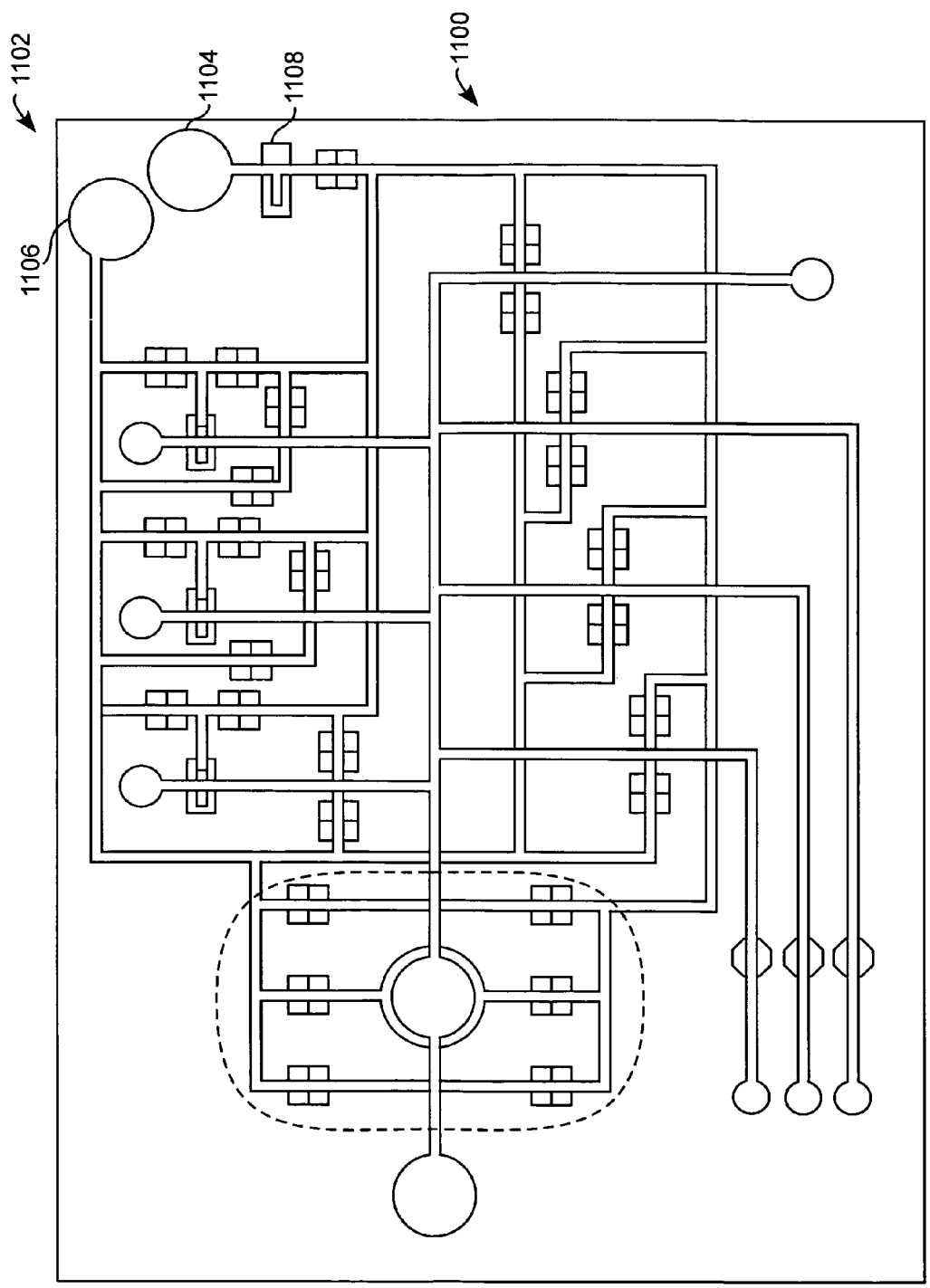
FIG. 11 is a top view of an example embodiment of an integrated microfluidic circuit incorporating EHVs, bi-stable EHVs, and an EHP, and using a single, on-board, blow-down hydraulic source.

FIG. 11 illustrates an example embodiment of an integrated microfluidic circuit 1100 similar to the integrated microfluidic circuit 900, except that the external hydraulic source 908 is replaced with an on-board, blow-down hydraulic source 1102, which includes a pressurized hydraulic source 1104 and a hydraulic sink 1106 as shown. In this example embodiment, the integrated microfluidic circuit 1100 also includes a single-use valve 1108 as shown.

In various embodiments, other Peltier-actuated valves, pumps, and/or sensors are combined with the various EHVs and/or EHPs described herein to provide large-scale, integrated microfluidic devices.

According to the principles described herein, when a single hydraulic source is distributed to multiple valves on a device, design complexity is significantly reduced as compared to prior device designs containing a large number of independent, purely pneumatic elastomeric valves.

In an example embodiment, a microfluidic device includes a substrate including multiple electro-hydraulic valves and/or electro-hydraulic pumps that each include a flow channel and one or more hydraulic control channels, actuators for controlling the electro-hydraulic valves and/or electro-hydraulic pumps, and a hydraulic pressure source operatively connected to the hydraulic control channels. In an example embodiment, the electro-hydraulic valves include a bi-phase valve. In an example embodiment, the actuators include Peltier devices. In an example embodiment, the hydraulic pressure source is external to the substrate. In an example embodiment, the hydraulic pressure source is an on-board hydraulic pump. In an example embodiment, the hydraulic pressure source is on-board blow-down hydraulic pressure source. In an example embodiment, one or more of the flow channels and hydraulic control channels has microfluidic dimensions.

Figures 12A, 12B:
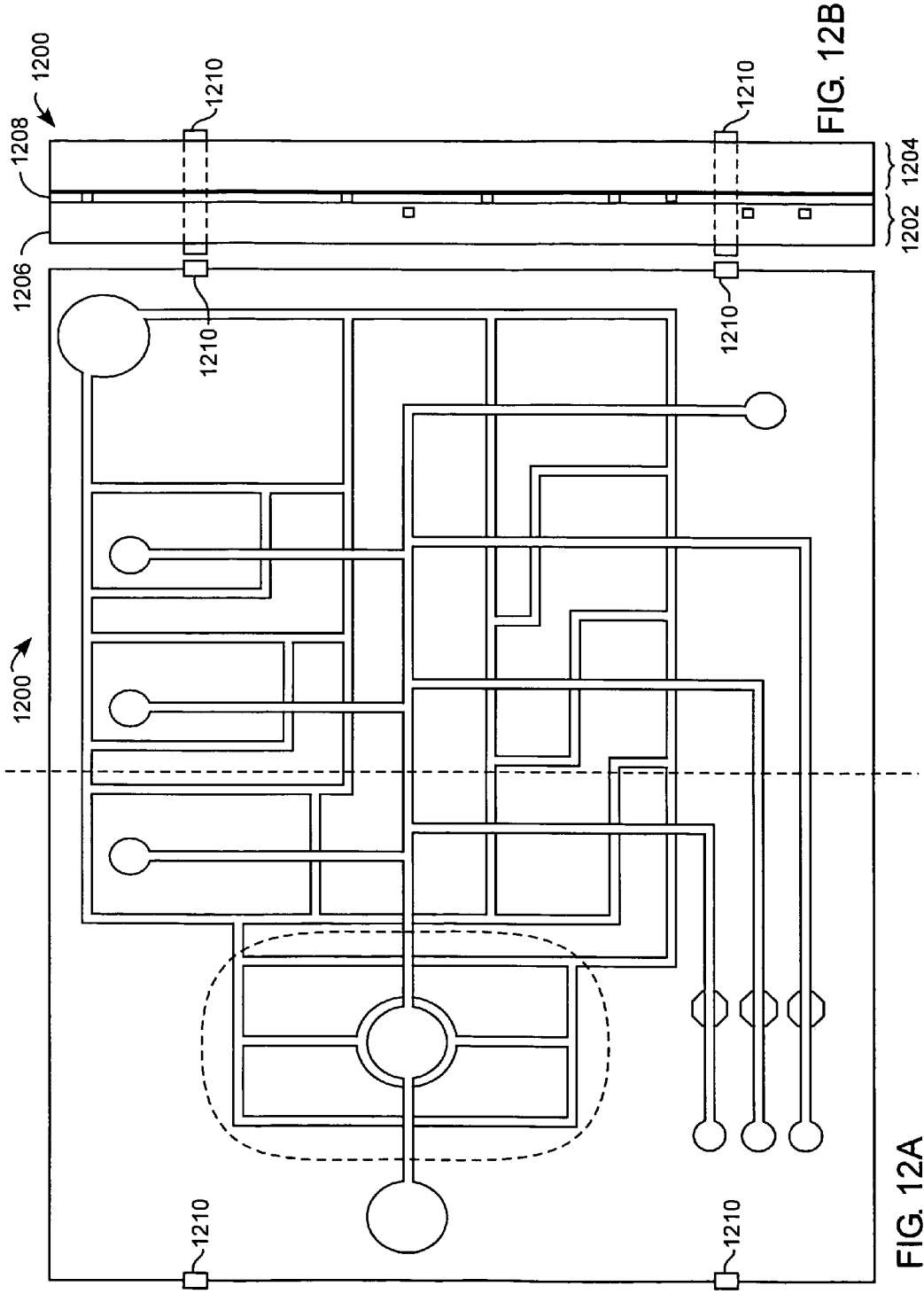
FIG. 12A is a top view of an example embodiment of a dual module microfluidic device.
FIG. 12B is a cross-sectional side view of the dual module microfluidic device of FIG. 12A.

FIGS. 12A and 12B illustrate an example embodiment of a dual module microfluidic device 1200. In this example embodiment, the dual module microfluidic device 1200 is similar to the integrated microfluidic circuit 1000 except as described below. In this example embodiment, the flow channels and hydraulic control channels are formed in a fluid-bearing module 1202, and the actuators are part of a control module 1204 that is detachably secured to the fluid-bearing module 1202. More specifically, the fluid-bearing module 1202 includes a fluid transport layer 1206 (for the flow channels and hydraulic control channels) and a control layer 1208 (for the actuators). In an example embodiment, the fluid-bearing module 1202 includes an elastomeric material. Example actuators include, but are not limited to, thermoelectric devices (e.g., Peltier heater/coolers), resistive heaters, electromagnetic devices (e.g., coils), and mechanical devices (e.g., plungers for deforming a surface of the fluid-bearing module 1202).

In this example embodiment, the fluid-bearing module 1202 and the control module 1204 are detachably secured together with a clamp mechanism 1210. For the dual module microfluidic device 1200 and its components, proper operation of the components requires that the fluid-bearing module 1202 be in good thermal and/or mechanical contact with the control module 1204. The example techniques described above for detachably securing modules together are also applicable to the dual module microfluidic device 1200.

Figure 13A:
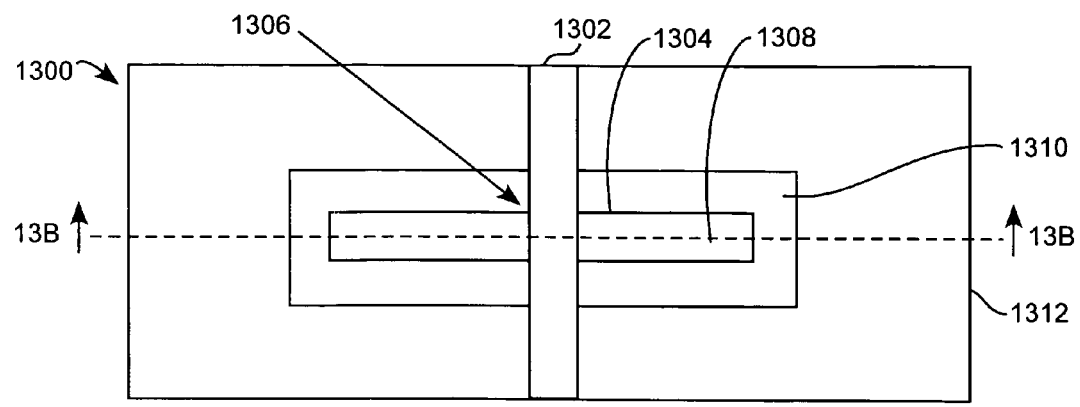
FIG. 13A is a top view of another example embodiment of an electro-hydraulic valve.
Figure 13B:
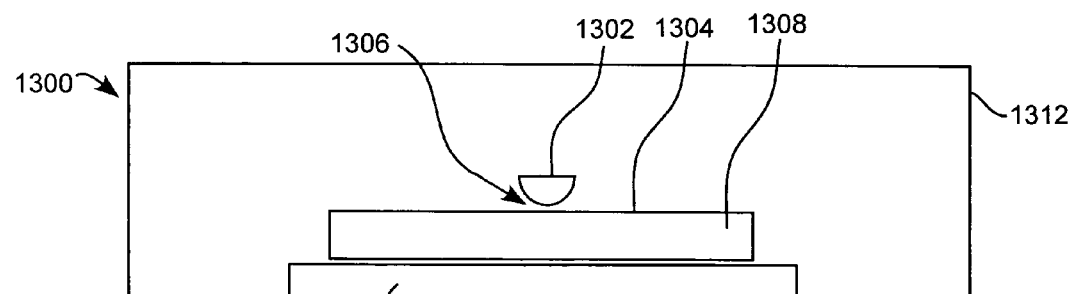
FIGS. 13B and 13C are cross-sectional side views of the electro-hydraulic valve of FIG. 13A in open and closed configurations, respectively.
Figure 13C:
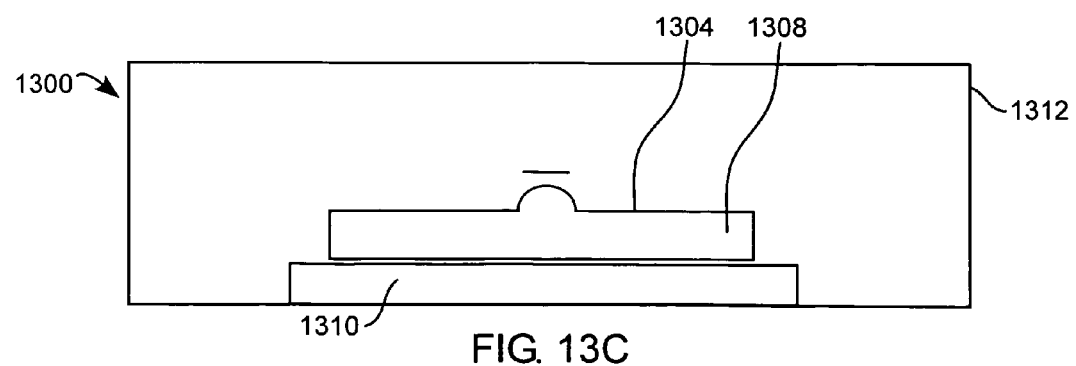

Other embodiments do not require a hydraulic pressure source. By way of example, and referring to FIGS. 13A-13C, an electro-hydraulic valve 1300 can operate by utilizing a controlled expansion of a bi-phase material in response to being heated. In this example embodiment, the electro-hydraulic valve 1300 includes a flow channel 1302, a hydraulic control channel 1304, closed at both ends, defining an electro-hydraulic valve junction 1306 where the hydraulic control channel 1304 is adjacent to the flow channel 1302, a bi-phase material 1308, that expands on melting, within the hydraulic control channel 1304 adjacent to the electro-hydraulic valve junction 1306, and a heating/cooling element 1310 adjacent to the bi-phase material 1308, the heating/cooling element 1310 being controllable to generate sufficient energy to cause the bi-phase material 1308 to transition from a solid phase to a liquid phase resulting in a hydraulic force being applied against the flow channel 1302 at the electro-hydraulic valve junction 1306 to close the electro-hydraulic valve 1300 (as shown in FIG. 13C).

In an example embodiment, the components of the electro-hydraulic valve 1300 are formed in, or supported by, a substrate 1312. By way of example, the substrate 1312 is made of a material such as polydimethylsiloxane (PDMS) with a low thermal conductivity. In an example embodiment, the flow channel 1302 and/or the hydraulic control channel 1304 has microfluidic dimensions. In an example embodiment, the bi-phase material 1308 includes paraffin wax.

Figure 14A:
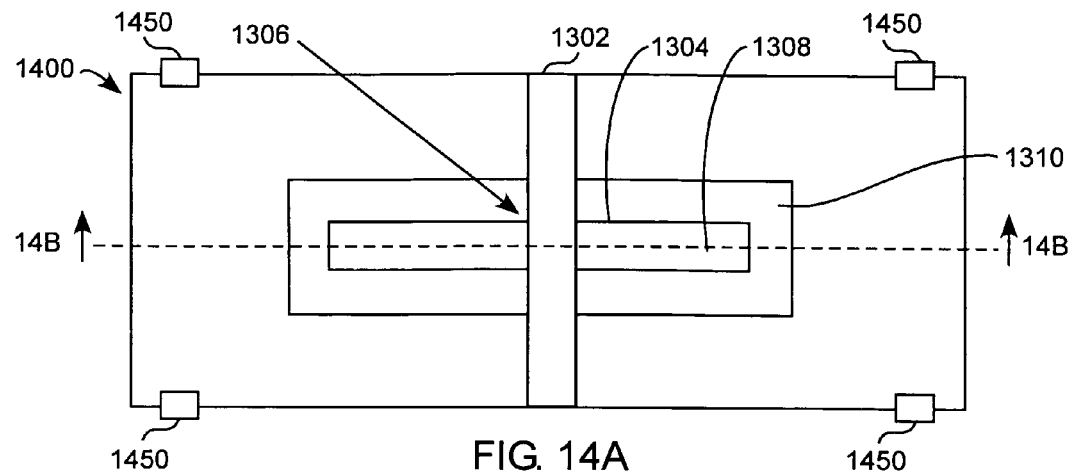
FIG. 14A is a top view of an example embodiment of a separable electro-hydraulic valve.
Figure 14B:
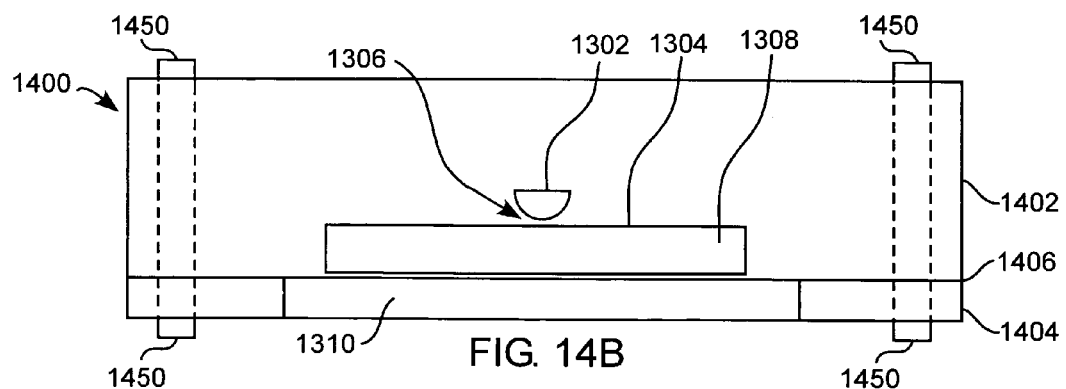
FIGS. 14B and 14C are cross-sectional side view of the separable electro-hydraulic valve of FIG. 14A in open and closed configurations, respectively.
Figure 14C:
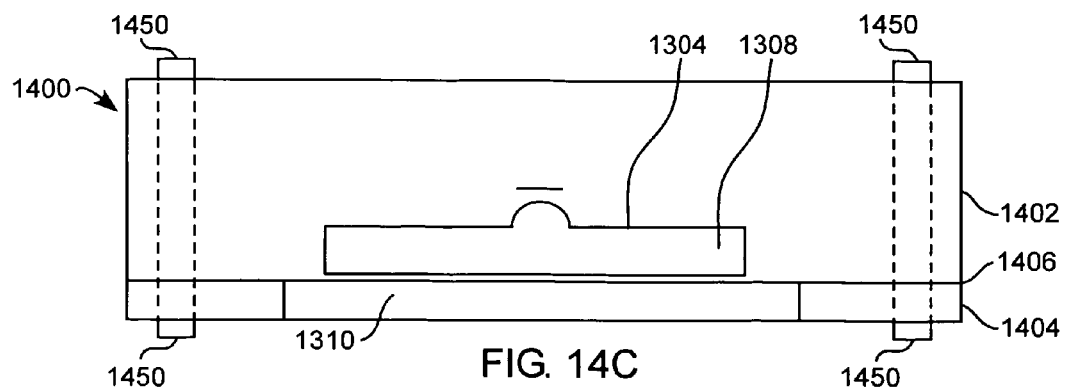

FIGS. 14A-14C illustrate an example embodiment of a separable electro-hydraulic valve 1400, which is similar to the electro-hydraulic valve 1300 except as now described. In this example embodiment, components of the separable electro-hydraulic valve 1400 (e.g., the flow channel 1302, the hydraulic control channel 1304, and the bi-phase material 1308) are formed in a fluid-bearing module 1402, and the heating/cooling element 1310 is formed in a control module 1404 that is detachably secured to the fluid-bearing module 1402. In an example embodiment, the fluid-bearing module 1402 includes an elastomeric material. In this example embodiment, a cover layer 1406 is provided between the fluid-bearing module 1402 and the control module 1404. For example, the cover layer 1406 is a thin membrane of a material with a relatively high thermal conductivity (for example, 2-micron-thick stainless steel).

In this example embodiment, the fluid-bearing module 1402 and the control module 1404 are detachably secured together with a clamp mechanism 1450. For the separable electro-hydraulic valve 1400 and its components, proper operation of the components requires that the fluid-bearing module 1402 be in good thermal and/or mechanical contact with the control module 1404. The example techniques described above for detachably securing modules together are also applicable to the separable electro-hydraulic valve 1400.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. An electro-hydraulic valve apparatus comprising:
   a flow channel;
   a hydraulic control channel adjacent to the flow channel;
   a flexible wall interposed between the flow channel and the hydraulic control channel, the flexible wall transitioning between an undeformed state and a deformed state, the deformed state occluding the flow channel; and
   first and second Peltier devices disposed adjacent to the hydraulic control channel on opposite sides of the flow channel, actuation of the first Peltier device blocking the hydraulic control channel so that a pressure within the hydraulic control channel increases to deform the flexible wall to the deformed state, actuation of the second Peltier device blocking the hydraulic control channel so that the pressure within the hydraulic control channel is reduced and the flexible wall returns to the undeformed state.

2. The electro-hydraulic valve apparatus of claim 1, wherein the flow channel has microfluidic dimensions.

3. The electro-hydraulic valve apparatus of claim 1, wherein the hydraulic control channel has microfluidic dimensions.

4. The electro-hydraulic valve apparatus of claim 1, wherein the hydraulic fluid comprises water.

5. The electro-hydraulic valve apparatus of claim 1, further including:
   a hydraulic pressure source operatively connected in fluidic communication with the hydraulic control channel to pressurize the hydraulic fluid.

6. The electro-hydraulic valve apparatus of claim 1, further including: an on-board hydraulic pump operatively connected in fluidic communication with the hydraulic control channel to pressurize the hydraulic fluid.

7. The electro-hydraulic valve apparatus of claim 1, further comprising a single hydraulic pressure source for pressurizing the hydraulic fluid.

8. The electro-hydraulic valve apparatus of claim 1, wherein the first Peltier device is configured to unblock the hydraulic control channel when the second Peltier device is actuated.

9. The electro-hydraulic valve apparatus of claim 1, wherein the second Peltier device is configured to unblock the hydraulic control channel when the first Peltier device is actuated.

10. The electro-hydraulic valve apparatus of claim 1, the actuation of the first Peltier device freezing a first plug in the hydraulic fluid to block the hydraulic control channel, the actuation of the second Peltier device freezing a second plug in the hydraulic fluid to block the hydraulic control channel.

11. The electro-hydraulic valve apparatus of claim 1, further including: an on-board, blow-down hydraulic pressure source operatively connected in fluidic communication with the hydraulic control channel to pressurize the hydraulic fluid.

12. The electro-hydraulic valve apparatus of claim 11, wherein the on-board, blow-down hydraulic pressure source comprises a pressurized fluid source, a single-use valve, and a hydraulic sink,
   wherein opening the single-use valve pressurizes the hydraulic fluid via a fluid in the pressurized fluid source.

13. The electro-hydraulic valve apparatus of claim 1, wherein the flow channel and the hydraulic control channel are formed in a fluid-bearing module, and the first and second Peltier devices are part of a control module that is detachably secured to the fluid-bearing module.

14. The electro-hydraulic valve apparatus of claim 13, wherein the fluid-bearing module includes an elastomeric material.

15. The electro-hydraulic valve apparatus of claim 13, wherein the fluid-bearing module is single-use, and wherein the control module is reusable with one or more additional fluid-bearing modules.

16. The electro-hydraulic valve apparatus of claim 15, wherein the fluid-bearing module comprises a cover layer that encloses the hydraulic control channel to prevent the hydraulic fluid from contaminating the one or more additional fluid-bearing modules.

* * * * *